(12) United States Patent
Uchino et al.

(10) Patent No.: US 10,028,315 B2
(45) Date of Patent: Jul. 17, 2018

(54) USER APPARATUS AND SIGNAL TRANSMISSION CONTROL METHOD

(71) Applicant: NTT DOCOMO, INC., Tokyo (JP)

(72) Inventors: Tooru Uchino, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/105,900

(22) PCT Filed: Dec. 16, 2014

(86) PCT No.: PCT/JP2014/083264
§ 371 (c)(1),
(2) Date: Jun. 17, 2016

(87) PCT Pub. No.: WO2015/093479
PCT Pub. Date: Jun. 25, 2015

(65) Prior Publication Data
US 2017/0034870 A1    Feb. 2, 2017

(30) Foreign Application Priority Data
Dec. 20, 2013   (JP) ................. 2013-264379

(51) Int. Cl.
*H04W 76/04*   (2009.01)
*H04W 52/02*   (2009.01)
(Continued)

(52) U.S. Cl.
CPC ......... *H04W 76/048* (2013.01); *H04L 5/0048* (2013.01); *H04L 5/0053* (2013.01);
(Continued)

(58) Field of Classification Search
None
See application file for complete search history.

(56) References Cited

U.S. PATENT DOCUMENTS

2007/0287468 A1   12/2007   Jeong et al.
2010/0135231 A1    6/2010   Harada et al.
(Continued)

FOREIGN PATENT DOCUMENTS

JP    2005-341586 A    12/2005
JP    2009-533995 A     9/2009
(Continued)

OTHER PUBLICATIONS

International Search Report issued in PCT/JP2014/083264 dated Feb. 17, 2015 (2 pages).
(Continued)

*Primary Examiner* — Kouroush Mohebbi
(74) *Attorney, Agent, or Firm* — Osha Liang LLP (57) ABSTRACT

A user apparatus configured to perform discontinuous reception control for discontinuously receiving a signal transmitted from a base station, including: a reception unit configured to receive information, from the base station, specifying a transmission cycle of a control signal in discontinuous reception performed at a predetermined discontinuous reception cycle; and a transmission control unit configured, when performing the discontinuous reception at the predetermined discontinuous reception cycle, to transmit the control signal in an active period in the discontinuous reception at a cycle longer than the discontinuous reception cycle based on the information specifying the transmission cycle.

16 Claims, 11 Drawing Sheets

(51) Int. Cl.
*H04W 72/08* (2009.01)
*H04L 5/00* (2006.01)
*H04W 72/04* (2009.01)
*H04W 76/28* (2018.01)
*H04W 88/02* (2009.01)
*H04W 88/08* (2009.01)

(52) U.S. Cl.
CPC ... *H04W 52/0216* (2013.01); *H04W 52/0229* (2013.01); *H04W 72/0406* (2013.01); *H04W 72/08* (2013.01); *H04W 76/28* (2018.02); *H04W 88/02* (2013.01); *H04W 88/08* (2013.01); *Y02D 70/00* (2018.01); *Y02D 70/1262* (2018.01); *Y02D 70/1264* (2018.01); *Y02D 70/24* (2018.01)

(56) References Cited

U.S. PATENT DOCUMENTS

| | | | |
|---|---|---|---|
| 2011/0158188 A1 | 6/2011 | Womack et al. | |
| 2012/0207040 A1* | 8/2012 | Comsa | H04W 72/1215 370/252 |

FOREIGN PATENT DOCUMENTS

| | | |
|---|---|---|
| JP | 2010-141666 A | 6/2010 |
| JP | 2011-514723 A | 5/2011 |
| JP | 2012-235352 A | 11/2012 |
| WO | 2008133307 A1 | 11/2008 |

OTHER PUBLICATIONS

Written Opinion of the International Searching Authority issued in PCT/JP2014/083264 dated Feb. 17, 2015 (4 pages).

3GPP TS 36.321 V11.3.0; "3rd Generation Partnership Project; Technical Specification Group Radio Access Network; Evolved Universal Terrestrial Radio Access (E-UTRA); Medium Access Control (MAC) protocol specification (Release 11)"; Jun. 2013 (3 pages).

NEC; "[Draft] Response to LS R1-070643 (R2-070411) on DRX interval and CQI reporting cycle in LTE"; 3GPP TSG RAN WG1 Meeting #48, R1-071131; St. Louis, USA, Feb. 12-16, 2007 (2 pages).

Office Action dated May 16, 2017, in corresponding Japanese Patent Application No. 2013-264379 (5 pages).

Office Action issued in the counterpart Japanese Patent Application No. 2013-264379, dated Jan. 23, 2018 (7 pages).

* cited by examiner

USER APPARATUS AND SIGNAL TRANSMISSION CONTROL METHOD

TECHNICAL FIELD

The present invention relates to a mobile communication system that performs discontinuous reception (DRX) control. More particularly, the present invention relates to a technique for a user apparatus UE in a DRX state to perform signal transmission.

BACKGROUND ART

In a communication system complying with LTE/LTE-advanced (to be referred to as LTE collectively hereinafter), DRX control is adopted for the purpose of battery saving of a user apparatus UE (refer to non-patent document 1).

In DRX control, a user apparatus UE that is RRC-connected (RRC connected UE) is managed with two states that are an Active state and an Inactive state.

In an Active state, the user apparatus UE monitors a DL control channel (PDCCH) so as to report feedback information (CSI: Channel State Information) or SRS (Sounding reference symbol) to a base station eNB.

On the other hand, in an Inactive state, the user apparatus UE does not monitor the DL control channel, and does not report feedback information and the like. By such a control, battery saving is realized.

Figure 1:
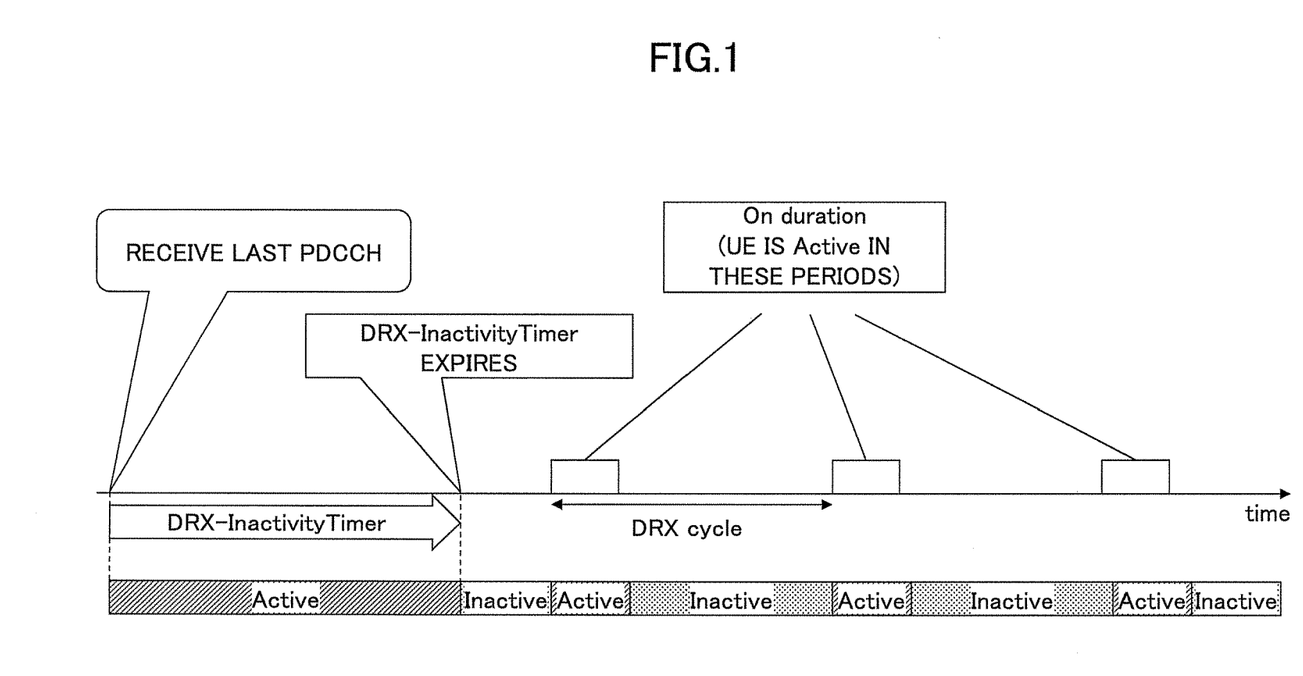
FIG. 1 is a diagram showing an example of transition by a DRX Inactivity Timer in DRX control.
Figure 2:
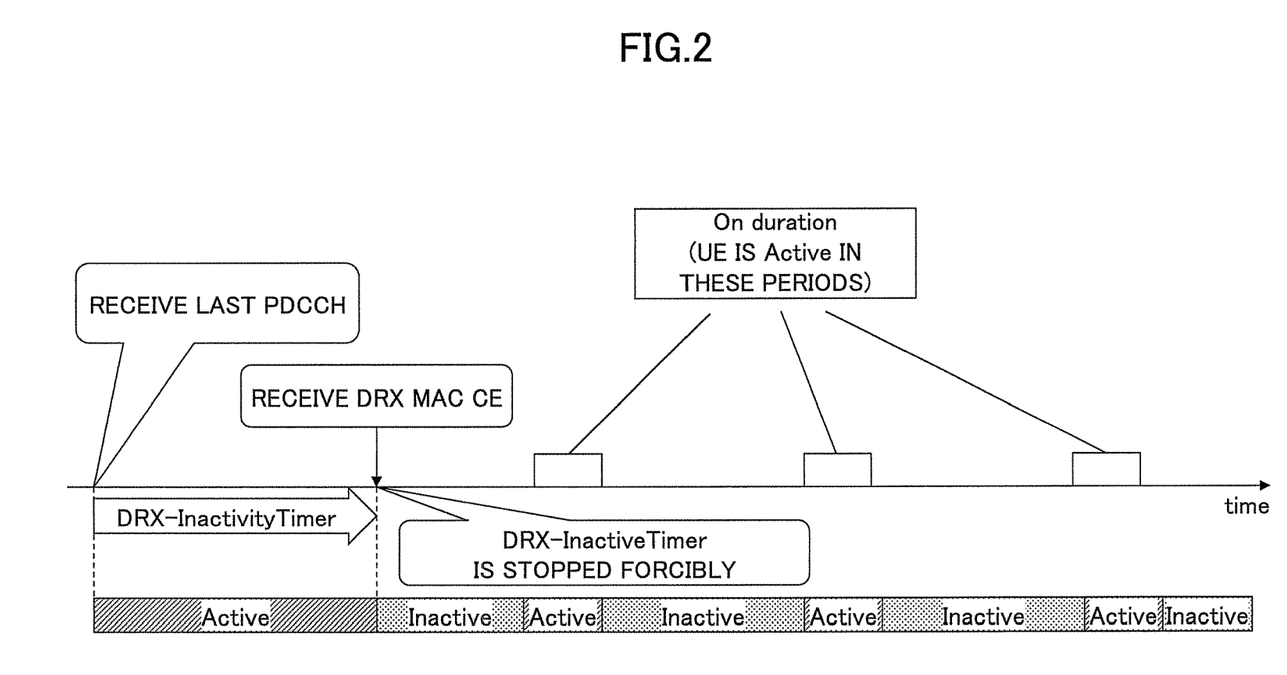
FIG. 2 is a diagram showing an example of transition by a DRX command MAC control Element (DRX MAC CE) in DRX control.

In DRX control, for example, as shown in FIG. 1 and FIG. 2, transition between an Active state and an Inactive state is performed.

FIG. 1 is a diagram showing an example of transition by a DRX Inactivity Timer. The DRX Inactivity Timer starts after receiving a PDCCH indicating that there is data, and after that, when the DRX Inactivity Timer expires without receiving a PDCCH, the state changes to the DRX state. In the example of FIG. 1, after receiving the last PDCCH, the DRX Inactivity Timer expires so that the state becomes the DRX state, then, an Active state and an Inactive state repeat at a DRX cycle. Also, in each DRX cycle, an Active period defined by an "on duration timer" is called on duration.

FIG. 2 is a diagram showing an example of transition by a DRX command MAC control Element (DRX MAC CE). As shown in FIG. 2, the DRX MAC CE forcibly stops the DRX Inactivity Timer so as to make the user apparatus UE to enter the DRX state even before expiration of the DRX Inactivity Timer.

RELATED ART DOCUMENT

Patent Document

[PATENT DOCUMENT 1] 3GPP TS 36.321 V11.3.0 (2013-06)、5.7 Discontinuous Reception (DRX)

SUMMARY OF THE INVENTION

Problem to be Solved by the Invention

As described before, in an Active state, the user apparatus UE monitors a DL control channel (PDCCH), and reports feedback information (CSI: Channel State Information) and SRS (Sounding reference symbol) to the base station eNB.

The CSI is channel state information of the user apparatus UE. The base station eNB performs scheduling (AMC) and the like based on the CSI fed back from the user apparatus UE. As specifically defined CSI, there are CQI indicating DL quality of the user apparatus UE, RI indicating optimal MIMO rank of the user apparatus UE, PMI indicating pre-coding matrix of optimum MIMO of the user apparatus UE, and the like.

The SRS is a signal reported for the base station eNB to measure UL quality, and the user apparatus UE performs SRS transmission at a periodically arriving timing, for example. CSI or SRS is described as CSI/SRS hereinafter.

In general, when scheduling a user apparatus UE in a DRX state, for either CSI or SRS, the transmission cycle is set in accordance with the DRX cycle (and arriving timing of on duration), so that CSI/SRS is transmitted every time at on duration of DRX.

As DRX, Short-DRX of a short cycle and Long-DRX of a long cycle are defined, in which a user apparatus UE to which Short-DRX is set enters a state of Short-DRX first, then, after that, enters a state of Long-DRX.

Figure 3:
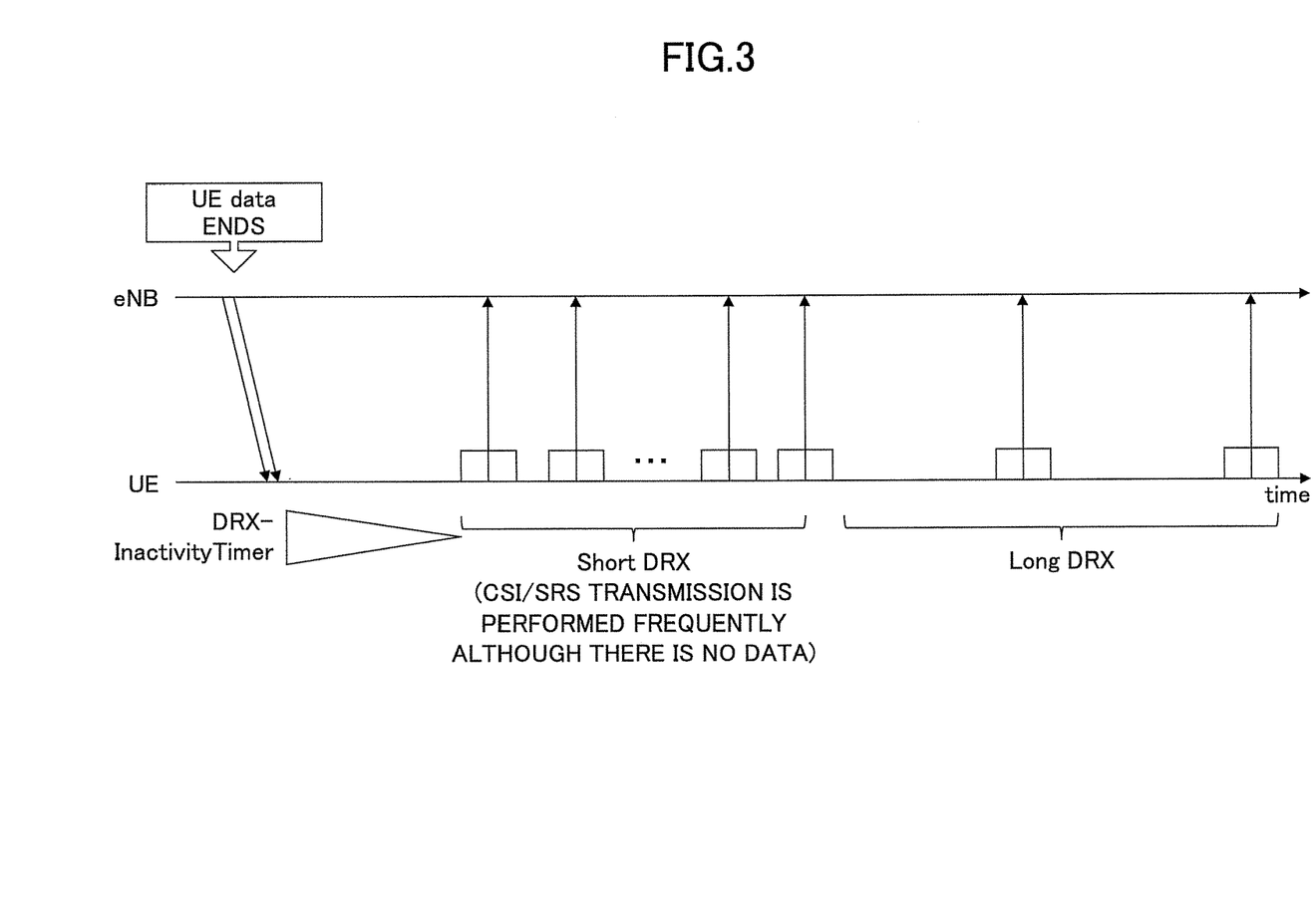
FIG. 3 is a diagram for explaining a problem in a conventional technique.

However, as shown in FIG. 3, in Short-DRX, CSI/SRS transmission is performed frequently even when there is no data. Thus, there is a problem in that battery saving effect cannot be obtained by DRX.

As for CSI/SRS transmission, it is desirable, from the viewpoint of battery saving, that it is transmitted at a long cycle in a DRX state, and that it is transmitted at a short cycle in a non-DRX state. However, in order to realize such a control, it is necessary to change, one by one, the cycle of CSI/SRS transmission by using an RRC message. However, such a control is difficult since the RRC message itself for changing the cycle transits the user apparatus UE to a non-DRX state.

On the other hand, as an alternative of the above-mentioned method, a control can be considered to make the CSI/SRS transmission cycle longer irrespective of non-DRX/DRX state and DRX state. However, it is not desirable to make the CSI/SRS transmission cycle longer since, when performing data transmission and reception, the base station eNB cannot obtain sufficient feedback from the user apparatus UE so that proper AMC cannot be estimated to cause decrease of throughput.

The present invention is contrived in view of the above-mentioned points, and an object of the present invention is to provide a technique that enables a user apparatus UE to perform transmission of a control signal such as CSI/SRS and the like at a proper cycle when the user apparatus UE is in a discontinuous reception state.

Means for Solving the Problem

According to an embodiment of the present invention, there is provided a user apparatus configured to perform discontinuous reception control for discontinuously receiving a signal transmitted from a base station, including:

a reception unit configured to receive information, from the base station, specifying a transmission cycle of a control signal in discontinuous reception performed at a predetermined discontinuous reception cycle; and a transmission control unit configured, when performing the discontinuous reception at the predetermined discontinuous reception cycle, to transmit the control signal in an active period in the discontinuous reception at a cycle longer than the discontinuous reception cycle based on the information specifying the transmission cycle.

Also, according to an embodiment of the present invention, there is provided a user apparatus configured to perform discontinuous reception control for discontinuously receiving a signal transmitted from a base station, including:

a reception unit configured to receive, from the base station, transmission available period information indicating a transmission available period of a control signal when performing discontinuous reception at a predetermined discontinuous reception cycle, and transmission unavailable period information indicating a transmission unavailable period of the control signal when performing the discontinuous reception; and a transmission control unit configured to repeatedly perform control, based on the transmission available period information and the transmission unavailable period information, for starting the transmission available period when performing discontinuous reception at the predetermined discontinuous reception cycle, transmitting the control signal in an active period during the transmission available period, and not-transmitting the control signal even in an active period in the transmission unavailable period that is started after the transmission available period ends.

Also, according to an embodiment of the present invention, there is provided a signal transmission control method executed by a user apparatus configured to perform discontinuous reception control for discontinuously receiving a signal transmitted from a base station, including:

a reception step of receiving information, from the base station, specifying a transmission cycle of a control signal in discontinuous reception performed at a predetermined discontinuous reception cycle; and a transmission control step of, when performing the discontinuous reception at the predetermined discontinuous reception cycle, transmitting the control signal in an active period in the discontinuous reception at a cycle longer than the discontinuous reception cycle based on the information specifying the transmission cycle.

Also, according to an embodiment of the present invention, there is provided a signal transmission control method executed by a user apparatus configured to perform discontinuous reception control for discontinuously receiving a signal transmitted from a base station, including:

a reception step of receiving, from the base station, transmission available period information indicating a transmission available period of a control signal when performing discontinuous reception at a predetermined discontinuous reception cycle, and transmission unavailable period information indicating a transmission unavailable period of the control signal when performing the discontinuous reception; and a transmission control step of repeatedly performing control, based on the transmission available period information and the transmission unavailable period information, for starting the transmission available period when performing discontinuous reception at the predetermined discontinuous reception cycle, transmitting the control signal in an active period during the transmission available period, and not-transmitting the control signal even in an active period in the transmission unavailable period that is started after the transmission available period ends.

Effect of the Present Invention

According to an embodiment of the present invention, it becomes possible to provide a technique that enables a user apparatus UE to perform transmission of a control signal such as CSI/SRS and the like at a proper cycle when the user apparatus UE is in a discontinuous reception state.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. For example, although it is assumed that a mobile communication system of the present embodiment is a system of a scheme complying with LTE, the present invention is not limited to LTE, and can be applied to other schemes. Also, although CSI/SRS transmission in a DRX state is the subject in the present embodiment, the signal to which the present invention can be applied is not limited to CSI/SRS.

In the specification and the claims, the term "LTE" is used to mean not only a communication scheme corresponding to 3GPP release 8 or 9, but also a communication scheme corresponding to 3GPP release 10, 11, 12 or later release.

(Whole Configuration, Process Outline)

Figure 4:
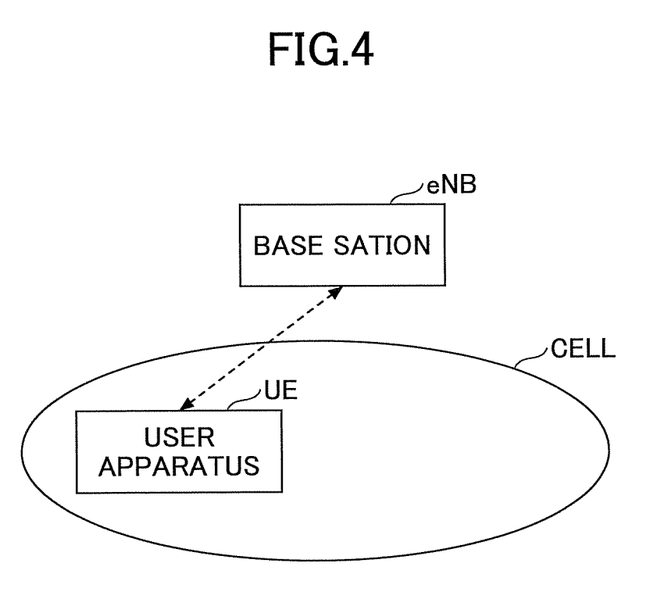
FIG. 4 is a block diagram of a communication system in an embodiment of the present invention.

FIG. 4 shows a block diagram of a communication system of an embodiment of the present invention (common to after-mentioned first and second embodiments). The communication system of the present embodiment is a communication system of an LTE scheme, and as shown in FIG. 4, includes a user apparatus and a base station eNB.

In the embodiment of the present invention, when the user apparatus UE is in a Short-DRX state by starting a drx-Shortcycle-timer, the user apparatus UE performs CSI/SRS transmission only in a specific "on duration".

Figure 5:
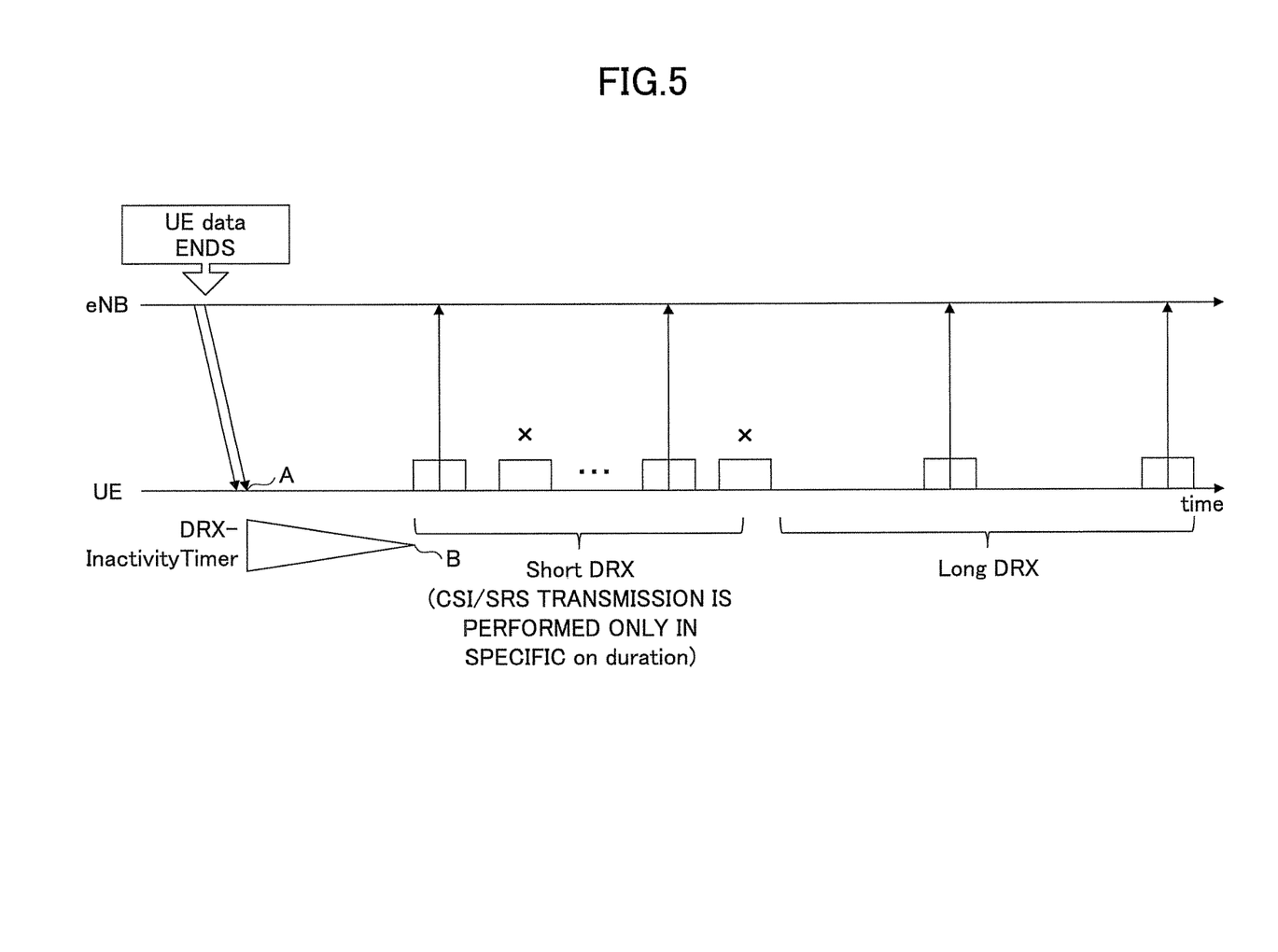
FIG. 5 is a diagram for explaining an outline of processing in an embodiment of the present invention.

Outline of this process is described with reference to FIG. 5. As shown in FIG. 5, after the base station eNB transmits the last PDCCH to the user apparatus (a time point of A in FIG. 5), that is, after transmission and reception data of the user apparatus UE ends, a drx-inactivityTimer is launched, and when the drx-inactivityTimer expires (at a time point of B), the user apparatus UE starts the Short-DRX state.

In a conventional technique, in the Short-DRX state, the user apparatus UE performs CSI/SRS transmission at every on duration. On the other hand, in the present embodiment, CSI/SRS transmission is performed only at a specific on duration. That is, in the conventional technique, CSI/SRS transmission is performed even at a timing of on duration shown as x in FIG. 5. On the other hand, in the present embodiment, a control is performed in which CSI/SRS transmission is not performed at the timing of on duration shown as x. Accordingly, useless CSI/SRS transmission can be reduced so that battery saving can be realized.

As embodiments for realizing such a control, in the following, a method (first embodiment) for specifying a transmission cycle of CSI/SRS for use in Short-DRX and a method (second embodiment) for using a timer (or counter) are described.

(First Embodiment)

<Process Content and the Like>

In the first embodiment, the base station eNB specifies, for the user apparatus UE, a transmission cycle of CSI/SRS for use in Short-DRX (when the user apparatus UE is in a Short-DRX state), so that the user apparatus UE transmits CSI/SRS according to the transmission cycle when it is in a Short-DRX state.

The base station eNB may designate, to the user apparatus UE, a value itself of the transmission cycle of CSI/SRS for use in Short-DRX, or the base station eNB may designate how many times of the current transmission cycle as the transmission cycle of CSI/SRS for use in the Short-DRX. The current transmission cycle is one already notified to the user apparatus UE by an RRC signaling and the like. The user apparatus UE is performing CSI/SRS transmission at the cycle when it is not in a DRX state.

As mentioned above, in the case where how many times of the current transmission cycle is specified as a transmission cycle of CSI/SRS for use in the Short-DRX, for example, in a state where the user apparatus UE is performing CSI/SRS transmission at a transmission cycle of 20 ms in the non-DRX state (while a drx-InactivityTimer is running), the base station eNB specifies $M_{drxcsi}$ times as a cycle. In this case, the user apparatus UE performs CSI/SRS transmission with a cycle of $20 \times M_{drxcsi}$ (ms) in Short-DRX.

Also, the base station eNB notifies the user apparatus UE of an offset value ($Offset_{drxcsi}$) indicating from which "on duration" the new cycle for use in Short-DRX is applied, so that the user apparatus UE starts application of the new cycle according to the offset value.

In a case where the offset value is used, it is desirable that the base station eNB specifies the offset value such that offset values are different (are distributed) among a plurality of user apparatuses UE. That is, the smaller the number of ULs transmitted in the same "on duration" (the number of user apparatuses UE simultaneously transmitting CSI/SRS) is, the more UL interference to other cells is reduced. Thus, it is desirable from which "on duration" the new cycle is applied is distributed among user apparatuses UE.

Each of $M_{drxcsi}$ and $Offset_{drxcsi}$ may be applied commonly to CSI and SRS. Also, separate values may be set for CSI and SRS respectively, for example, in which $M_{drxcsi}$ and $Offset_{drxcsi}$ are applied to CSI, and $M_{drxsrs}$ and $Offset_{drxsrs}$ are applied to SRS.

Each of the above-mentioned cycle, the value indicating how many times, and the offset value is transmitted to the user apparatus UE by the base station eNB by an RRC signaling and the like. However, the notification message is not limited to the RRC signaling, and it may be transmitted more dynamically (by MAC signaling, PHY (Physical) signaling and the like).

Also, a plurality of patterns may be prepared (set) for each of $M_{drxcsi}$ and $Offset_{drxcsi}$ (same applies to $M_{drxsrs}$ and $Offset_{drxsrs}$) beforehand, so that which pattern to use may be dynamically specified from the base station eNB to the user apparatus UE (by MAC signaling, PHY (Physical) signaling) and the like. For dynamically specifying it, for example, the base station eNB holds setting and state of each user apparatus UE, and notifies of which pattern to use when detecting that the user apparatus UE enters a Short-DRX state. The base station eNB can notify the user apparatus UE of a pattern in which the value of the cycle becomes large when the traffic is congested, for example.

Figure 6:
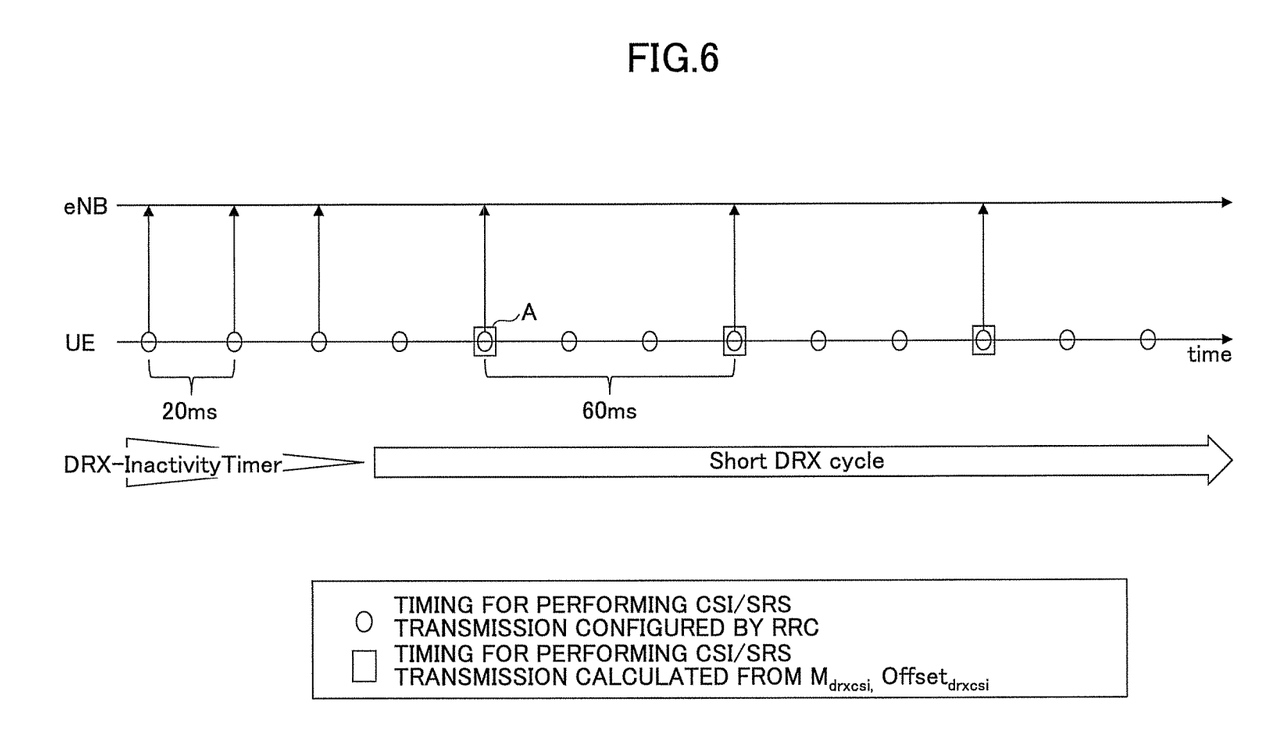
FIG. 6 is a diagram showing a CSI/SRS transmission operation example in a first embodiment.

FIG. 6 shows a CSI/SRS transmission operation example in a first embodiment. FIG. 6 shows an example of a case where CSR/SRS, transmitted at a cycle of 20 ms, is caused to be transmitted at a cycle of 60 ms ($M_{drxcsi}=3$) in Short-DRX.

In FIG. 6, the circle (○) on the time axis corresponding to the user apparatus UE indicates a CSI/SRS transmission timing according to a cycle that is notified to the user apparatus UE by an RRC signaling. If the user apparatus UE is not in a DRX state, CSI/SRS transmission is performed at this timing every time. Also, a circle that is enclosed by a rectangular indicates a timing, at which CSI/SRS transmission is performed, calculated based on $M_{drxcsi}$ and $Offset_{drxcsi}$ in a state of Short-DRX. In this example, although the timing agrees with on-duration, these do not necessarily agree. For example, in a case where a timing for performing CSI/SRS transmission calculated from $M_{drxcsi}$ and $Offset_{drxcsi}$ comes between an on-duration and a next on-duration, CSI/SRS transmission is performed at the next on-duration. That is, the on-duration may be regarded as a timing for performing CSI/SRS transmission calculated from $M_{drxcsi}$ and $Offset_{drxcsi}$. By the way, there may be a gap, considering a process delay, between a timing for performing CSI/SRS transmission calculated from $M_{drxcsi}$ and $Offset_{drxcsi}$, and an actual transmission timing. For example, when a timing for performing CSI/SRS transmission calculated from $M_{drxcsi}$ and $Offset_{drxcsi}$ comes, actual transmission may be performed at a transmission timing (on-duration) that comes after k [ms] from this timing.

In FIG. 6, before the drx-inactivityTimer expires, since the user apparatus UE is in an Active state, the user apparatus UE performs CSI/SRS transmission according to a cycle (20 ms) notified by an RRC signaling.

After the drx-inactivityTimer expires and the user apparatus UE enters a Short-DRX state, the user apparatus UE starts CSI/SRS transmission at on duration of a timing of A according to $Offset_{drxcsi}$. After that, the user apparatus UE performs CSI/SRS transmission at "on duration" of a cycle of $3 \times 20=60$ ms.

<Apparatus Configuration, Process Flow>

Figure 7:
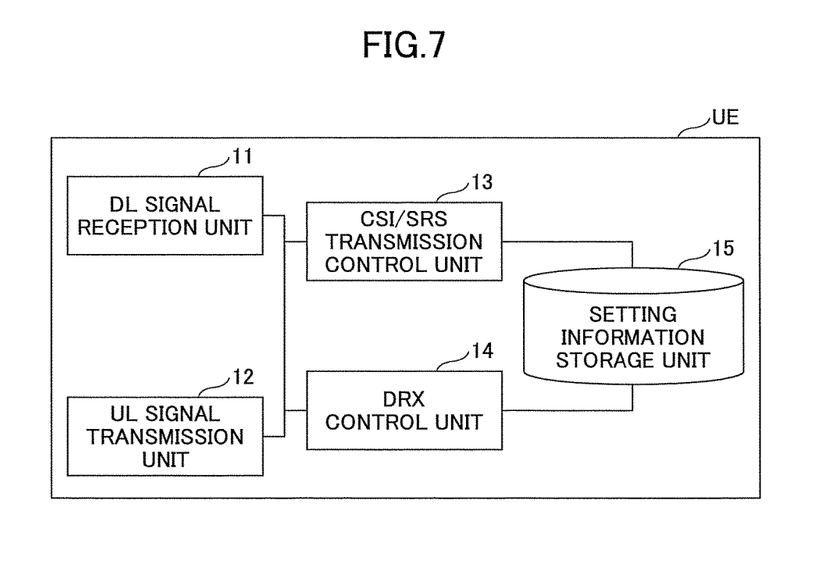
FIG. 7 is a block diagram of a user apparatus UE in the first embodiment.

FIG. 7 shows a functional block diagram of the user apparatus UE in the present embodiment. As shown in FIG. 7, the user apparatus UE includes a DL signal reception unit 11, an UL signal transmission unit 12, a CSI/SRS transmission control unit 13, a DRX control unit 14 and a setting information storage unit 15. By the way, FIG. 7 only shows functional units especially related to the embodiment of the present invention in the user apparatus UE, and the user apparatus UE also includes at least functions, not shown in the figure, for performing operation complying with LTE.

The DL signal reception unit 11 includes a function that receives various downlink signals from the base station eNB, and that obtains upper layer information from a received signal of physical layer. The UL signal transmission unit 12 includes a function that generates various signals of physical layer from upper layer information to be transmitted from the user apparatus UE, and that transmits the signal to the base station eNB.

The setting information storage unit 15 stores various setting information (including $M_{drxcsi}$, $Offset_{drxcsi}$ and the like) transmitted from the base station eNB by a signaling. The CSI/SRS transmission control unit 13 is a functional unit configured to perform CSI/SRS transmission control. Especially, the CSI/SRS transmission control unit 13 performs CSI/SRS transmission at a timing based on $M_{drxcsi}$ and Offset$_{drxcsi}$ and the like in Short-DRX as described in the present embodiment. The DRX control unit 14 performs DRX control based on setting information. For example, when there is setting information of Short-DRX, the DRX control unit 14 performs operation of Short-DRX according to the setting information.

Figure 8:
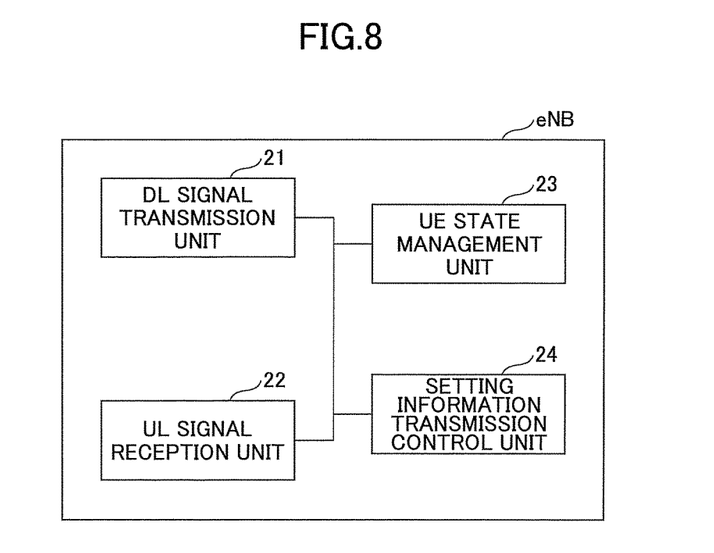
FIG. 8 is a block diagram of a base station eNB in the first embodiment (second embodiment)

FIG. 8 shows a functional block diagram, of a base station eNB in the first and the second embodiments. As shown in FIG. 8, the base station eNB includes a DL signal transmission unit 21, an UL signal reception unit 22, a UE state management unit 23, and setting information transmission control unit 24. By the way, FIG. 8 only shows functional units especially related to the embodiment of the present invention in the base station eNB, and the base station eNB also includes at least functions, not shown in the figure, for performing operation complying with LTE.

The DL signal transmission unit 21 includes a function that generates various signals of physical layer from upper layer information to be transmitted from the base station eNB, and that transmits the signals to the user apparatus UE side. The UL signal reception unit 22 includes a function that receives various uplink signals from the user apparatus UE and that obtains upper layer information from a received signal of physical layer.

The UE state management unit 23 holds information indicating a state for each connected user apparatus UE, and updates the information. The information indicating the state includes information indicating that the user apparatus UE enters a Short-DRX state. The setting information transmission control unit 24 determines various parameters to be transmitted to the user apparatus UE based on a current state of the user apparatus UE in the UE state management unit 23, and setting information already notified to the user apparatus UE, and the like, and notifies of the parameters. The parameters include $M_{drxcsi}$, Offset$_{drxcsi}$ and the like, and values of each timer (counter) described in the second embodiment.

Figure 9:
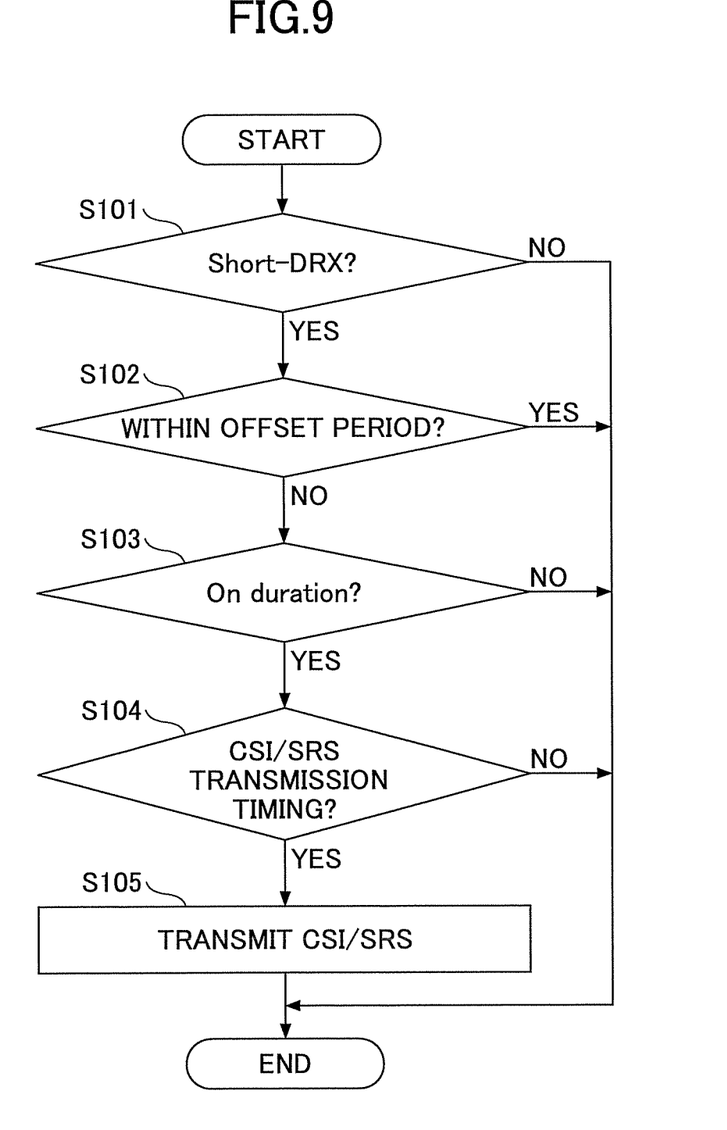
FIG. 9 is a sequence diagram showing operation of the user apparatus UE in the first embodiment.

Next, with reference to a flowchart of FIG. 9, an operation example of the user apparatus UE related to CSI/SRS transmission is described. The following operation is mainly executed by the CSI/SRS transmission control unit 13 based on a state of DRX control executed by the DRX control unit 14. Also, the operation shown in FIG. 9 is performed periodically every predetermined time (example: every subframe), for example.

First, the user apparatus UE determines whether the current state is a Short-DRX state or not (step 101). When the state is the Short-DRX state, the process goes to step 102, and it is determined whether the current time is within an offset period that is defined by Offset$_{drxcsi}$ and the like.

When it is not within the offset period in step 102, the process goes to step 103, and the user apparatus UE determines whether the current time is on duration or not. When the current time is on duration, the process goes to step 104.

In step 104, the user apparatus UE determines whether the current time is a transmission timing of CSI/SRS calculated from $M_{drxcsi}$ and the like. The case where the current time is the transmission timing of CSI/SRS includes not only a case where on duration of the current time agrees with a transmission timing of CSI/SRS calculated from $M_{drxcsi}$ and the like, but also a case where the transmission timing of CSI/SRS calculated from $M_{drxcsi}$ and the like comes between a pervious on duration and on duration of this time.

In step 104, when it is the transmission timing of CSI/SRS, the process goes to step 105, so that the user apparatus UE performs transmission of CSI/SRS.

When the determination result is No in step 101, 103 or 104, or when the determination result is Yes in step 102, the process of the time ends.

(Second Embodiment)
<Process Content>

In the second embodiment, control is performed by using a timer. In the present embodiment, as the timer, a CSI-Timer and a noCSI-Timer are used for CSI, and an SRS-Timer and a noSRS-Timer are used for SRS. These are collectively referred to as CSI/SRS-Timer and noCSI/SRS-Timer. Also, a timer common to CSI and SRS may be used. Also in such a case, it is described as CSI/SRS-Timer and noCSI/SRS-Timer.

The user apparatus UE is notified of values of the CSI/SRS-Timer and the noCSI/SRS-Timer from the base station eNB by an RRC signaling and the like (or by more dynamic signaling), and the values are held in the setting information storage unit. Then, the user apparatus UE starts the CSI/SRS-Timer at the same time when Short-DRX starts, and the user apparatus UE performs CSI/SRS transmission at on duration while the timer is running.

When the CSI/SRS-timer expires, the user apparatus UE starts the noCSI/SRS-Timer, and the user apparatus UE does not perform CSI/SRS transmission even at on duration while the timer is running. Also when the noCSI/SRS-Timer expires, the user apparatus UE starts the CSI/SRS-timer. Then, the user apparatus UE starts a drx-InactivityTimer and stops the CSI/SRS-timer and the noCSI/SRS-timer.

In the above-mentioned example, although "timer" is used, "counter" may be used. These are substantially the same, and used for measuring a predetermined time. Thus, these may be collectively referred to as "timer".

Figure 10:
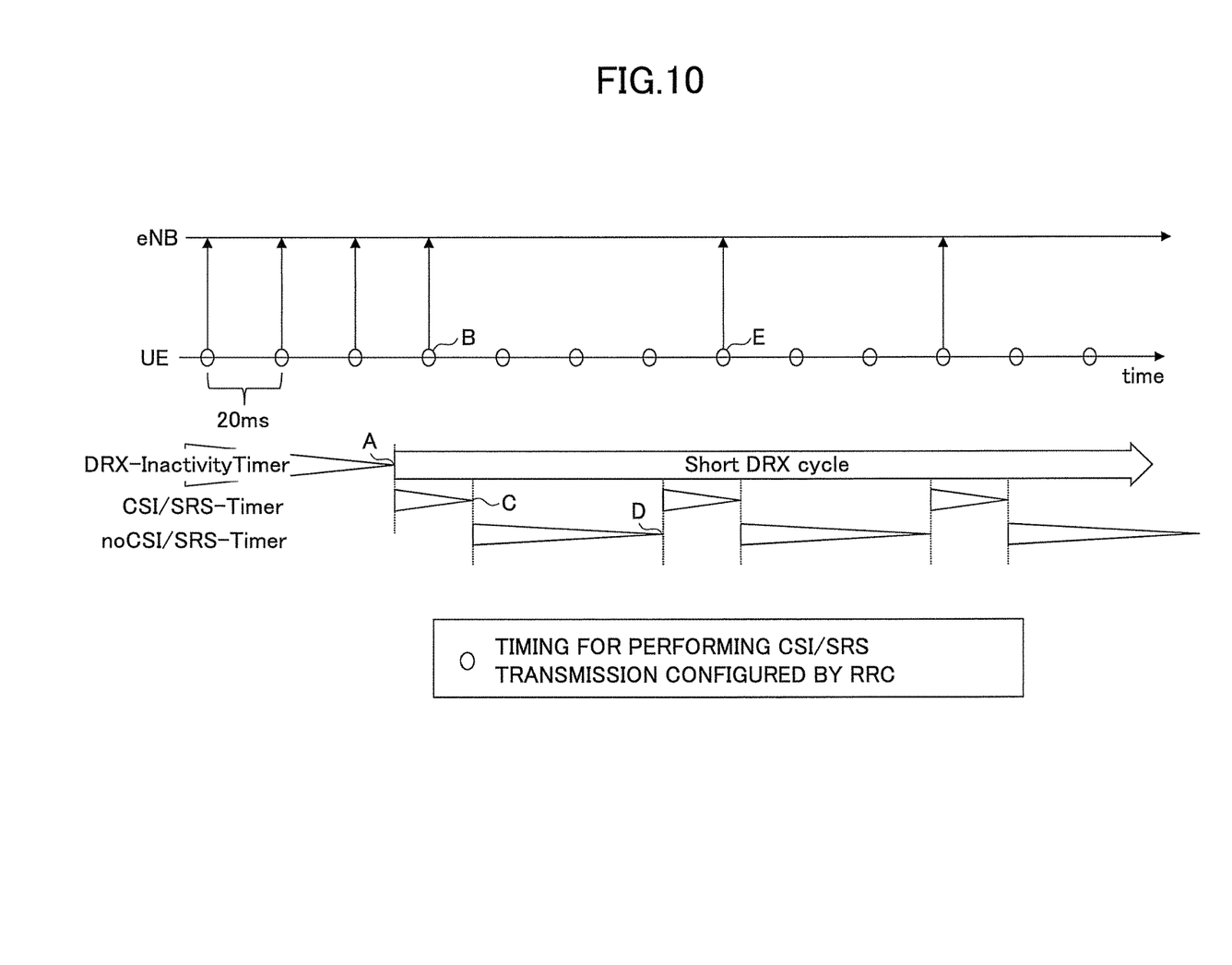
FIG. 10 is a diagram showing a CSI/SRS transmission operation example in a second embodiment.

FIG. 10 shows a concrete example of the operation in the present embodiment. Also in the example of FIG. 10, like the example of FIG. 6, the circle indicates a CSI/SRS transmission timing according to a cycle that is notified of by an RRC signaling for the user apparatus UE. Also, in the Short-DRX period, an example is shown in which "on duration" is the same as the timing. In the present embodiment, even when there is a difference between the CSI/SRS transmission timing according to the cycle notified by the RRC signaling and "on duration", CSI/SRS transmission is performed at on duration while the CSI/SRS-Timer is running.

In FIG. 10, the drx-inactivityTimer expires at the time point of A, so that Short-DRX starts and the CSI/SRS-timer starts. While the CSI/SRS-timer is running, CSI/SRS transmission is performed at on duration shown as B. At the time point of C, the CSI/SRS-timer expires and the noCSI/SRS-Timer is started. While the noCSI/SRS-Timer is running, CSI/SRS transmission is not performed even at on duration.

Then, at the time point of D, the noCSI/SRS-Timer expires and the CSI/SRS-timer starts. The user apparatus UE performs CSI/SRS transmission at a timing of on duration of E while the CSI/SRS-timer is running. Such an operation is performed repeatedly in a Short-DRX period. Even in this period, if the user apparatus UE receives a PDCCH indicating that there is data (assignment), the drx-inactivityTimer is started, and the CSI/SRS-timer and the noCSI/SRS-Timer are stopped.

For example, several types of lengths of each timer are defined beforehand, so that the base station eNB determines a timer according to a current CSI/SRS transmission cycle that is notified by RRC, and the base station eNB notifies the user apparatus UE of the timer. For example, a time of a length of a predetermined number of times of the current CSI/SRS transmission cycle is determined to be the noCSI/SRS-Timer, and a timer of a time shorter than it can be determined as the CSI/SRS-Timer. Also, like the first embodiment, an offset value indicating a time until the CSI/SRS-timer starts after Short-DRX starts may be notified of. In this case, for example, the user apparatus UE does not perform CSI/SRS transmission until the CSI/SRS-timer is started after Short-DRX starts.

<Apparatus Configuration, Process Flow>

Figure 11:
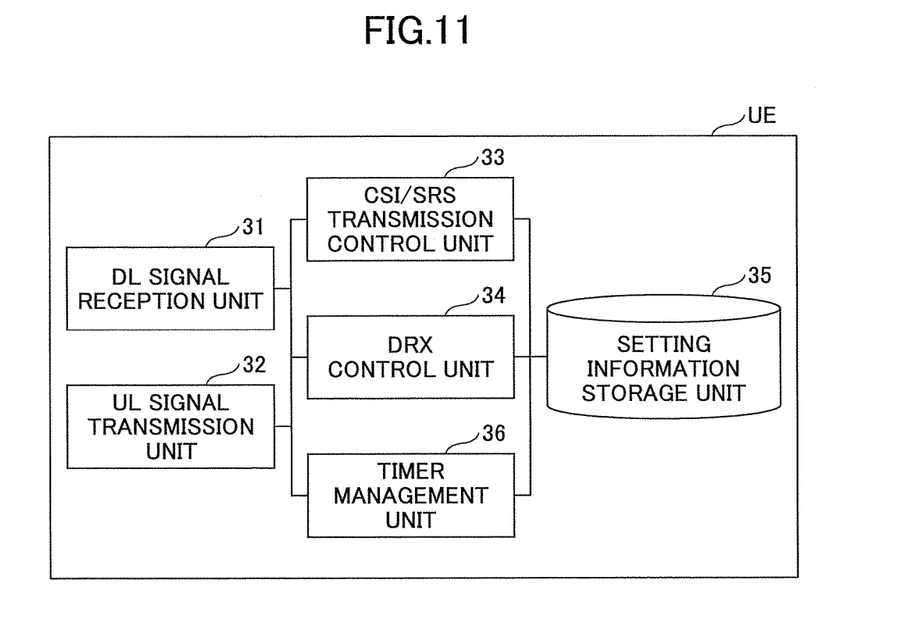
FIG. 11 is a block diagram of a user apparatus UE in the second embodiment.

FIG. 11 shows a functional block diagram of the user apparatus UE in the present embodiment. As shown in FIG. 11, the user apparatus UE includes a DL signal reception unit 31, an UL signal transmission unit 32, a CSI/SRS transmission control unit 33, a DRX control unit 34, a setting information storage unit 34, and a timer management unit 35. By the way, FIG. 11 only shows functional units especially related to the embodiment of the present invention in the user apparatus UE, and the user apparatus UE also includes at least functions, not shown in the figure, for performing operation complying with LTE.

The DL signal reception unit 31 includes a function that receives various downlink signals from the base station eNB, and that obtains upper layer information from a received signal of physical layer. The UL signal transmission unit 32 includes a function that generates various signals of physical layer from upper layer information to be transmitted from the user apparatus UE, and that transmits the signal to the base station eNB.

The setting information storage unit 35 stores various setting information (including a value of CSI/SRS-Timer, a value of noCSI/SRS-Timer and the like) transmitted from the base station eNB by a signaling. The CSI/SRS transmission control unit 33 is a functional unit configured to perform CSI/SRS transmission control. Especially, the CSI/SRS transmission control unit 33 performs CSI/SRS transmission at a timing based one the CSI/SRS-Timer, the noCSI/SRS-Timer and the like in Short-DRX as described in the present embodiment. The DRX control unit 34 performs DRX control based on setting information. For example, when there is setting information of Short-DRX, the DRX control unit 34 performs operation of Short-DRX according to the setting information.

The timer management unit 36 manages start and end of timers such as the CSI/SRS-Timer and the noCSI/SRS-Timer. For example, the timer management unit 36 starts the CSI/SRS-Timer/the noCSI/SRS-Timer by an instruction from the CSI/SRS transmission control unit 33 or the DRX control unit 34.

Figure 12:
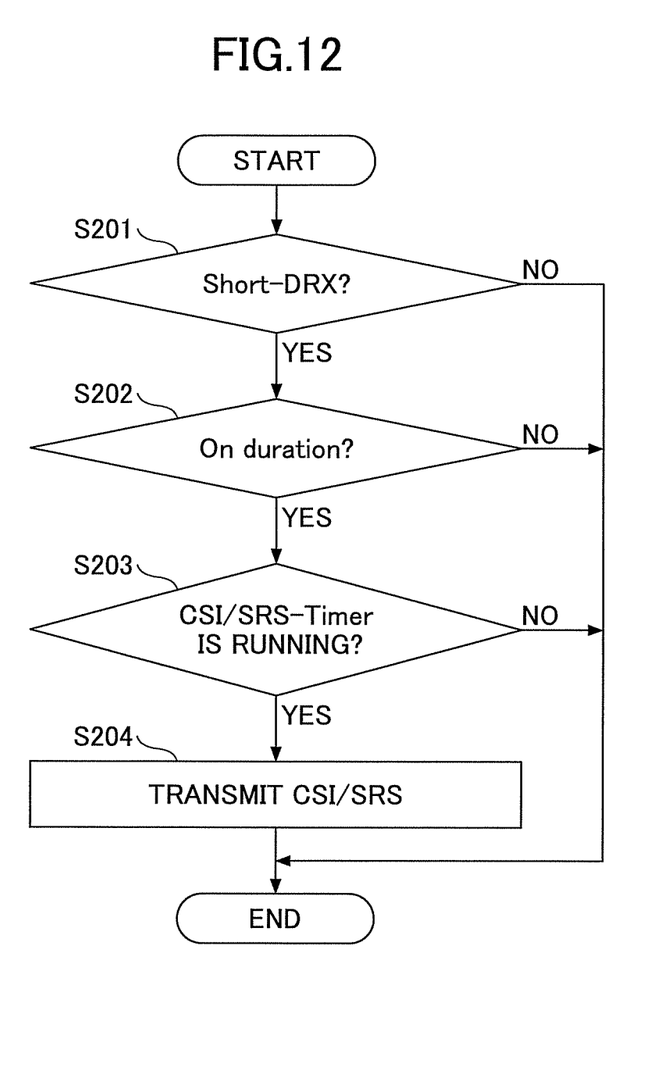
FIG. 12 is a sequence diagram showing operation of the user apparatus UE in the second embodiment.

Next, with reference to a flowchart of FIG. 12, an operation example of the user apparatus UE related to CSI/SRS transmission in the second embodiment is described. The following operation is mainly executed by the CSI/SRS transmission control unit 33 based on DRX control by the DRX control unit 34 and timer operation by the timer management unit 36. Also, the operation shown in FIG. 12 is performed periodically every predetermined time (example: every subframe), for example.

First, the user apparatus UE determines whether the current state is a Short-DRX state or not (step 201). When the state is the Short-DRX state, the process goes to step 202, and it is determined whether the current time is on duration or not. When the current time is on duration, the process goes to step 203.

In step 203, the user apparatus UE determines whether the CSI/SRS Timer is running at the current time by referring to the timer management unit 36. When the timer is running, the process goes to step 204, so that the user apparatus UE performs transmission of CSI/SRS. When the determination result is No in step 201, 202 or 203, the process of the time ends.

(Summary of Embodiments, Effect and the Like)

As described above, in the present embodiment, there is provided a user apparatus configured to perform discontinuous reception control for discontinuously receiving a signal transmitted from a base station, including:

a reception unit configured to receive information, from the base station, specifying a transmission cycle of a control signal in discontinuous reception performed at a predetermined discontinuous reception cycle; and a transmission control unit configured, when performing the discontinuous reception at the predetermined discontinuous reception cycle, to transmit the control signal in an active period (on duration) in the discontinuous reception at a cycle longer than the discontinuous reception cycle based on the information specifying the transmission cycle. According to the user apparatus, when the user apparatus is in a discontinuous reception state, it becomes possible to perform transmission of a control signal such as CSI/SRS and the like at a proper cycle. The proper cycle is, for example, a cycle that is effective for battery saving.

The information specifying the transmission cycle is, for example, information indicating the number of times of a transmission cycle of the control signal in a period when the discontinuous reception is not performed as the transmission cycle of the control signal when performing the discontinuous reception. Accordingly, by notifying of information indicating the number of times instead of a transmission period itself, information amount for notification can be decreased.

The reception unit may be configured to receive information (example: offset value) indicating a timing at which to start transmission of the control signal at the transmission cycle which is based on the information specifying the transmission cycle, and the transmission control unit may be configured to start transmission of the control signal when performing discontinuous reception based on the information indicating the timing. In this way, by providing a mechanism for notifying of information indicating a timing for starting transmission of a control signal, for example, the base station eNB can distribute start timing among a plurality of user apparatuses UE, so that UL interference to other cells can be reduced.

Also, in the present embodiment, there is provided a user apparatus configured to perform discontinuous reception control for discontinuously receiving a signal transmitted from a base station, including:

a reception unit configured to receive, from the base station, transmission available period information (example: value of CSI/SRS-Timer) indicating a transmission available period of a control signal when performing discontinuous reception at a predetermined discontinuous reception cycle, and transmission unavailable period information (example: value of noCSI/SRS-Timer) indicating a transmission unavailable period of the control signal when performing the discontinuous reception; and a transmission control unit configured to repeatedly perform control, based on the transmission available period information and the transmission unavailable period information, for starting the transmission available period when performing discontinuous reception at the predetermined discontinuous reception cycle, transmitting the control signal in an active period during the transmission available period, and not-transmitting the control signal even in an active period in the transmission unavailable period that is started after the transmission available period ends. According to the user apparatus, when the user apparatus is in a discontinuous reception state, it becomes possible to perform transmission of a control signal such as CSI/SRS and the like at a proper cycle. The proper cycle is, for example, a cycle that is effective for battery saving.

Although the control signal is, for example, channel state information or a sounding reference symbol, the control signal is not limited to these. Although the predetermined discontinuous reception cycle is, for example, a discontinuous reception cycle of short-DRX in LTE, the predetermined discontinuous reception cycle is not limited to this.

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

The base station eNB described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the base station and the user apparatus have been explained by using functional block diagrams. However, such an apparatus may be implemented in hardware, software, or a combination thereof. The software that executes operation corresponding to processing described in embodiments of the present invention (executed by a processor provided in the apparatus such as the user apparatus UE, and the base station eNB) may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-264379, filed in the JPO on Dec. 20, 2013, and the entire contents of the Japanese patent application No. 2013-264379 are incorporated herein by reference.

DESCRIPTION OF REFERENCE SIGNS

UE user apparatus
eNB base station
11, 31 DL signal reception unit
12, 32 UL signal transmission unit
13, 33 CSI/SRS transmission control unit
14, 34 DRX control unit
15, 35 setting information storage unit
36 timer management unit
21 DL signal transmission unit
22 UL signal reception unit
23 UE state management unit
24 setting information transmission control unit

The invention claimed is:

1. A user apparatus configured to perform discontinuous reception control for discontinuously receiving a signal transmitted from a base station, comprising:
   a receiver that receives information, from the base station, specifying a transmission cycle of a control signal in discontinuous reception performed at a cycle of Short-Discontinuous Reception (DRX), wherein the user apparatus is for use in a communication system in which the Short-DRX and a Long-DRX are defined; and
   a transmitter that, when performing the discontinuous reception at the cycle of Short-DRX, transmits the control signal in an active period in the discontinuous reception at a cycle longer than the cycle of Short-DRX based on the information specifying the transmission cycle.

2. The user apparatus as claimed in claim 1, wherein the information specifying the transmission cycle is information indicating the number of times of a transmission cycle of the control signal in a period when the discontinuous reception is not performed as the transmission cycle of the control signal when performing the discontinuous reception.

3. The user apparatus as claimed in claim 2, wherein the receiver receives information indicating a timing at which to start transmission of the control signal at the transmission cycle which is based on the information specifying the transmission cycle, and
   the transmitter starts transmission of the control signal when performing discontinuous reception based on the information indicating the timing.

4. The user apparatus as claimed in claim 2, wherein the control signal is channel state information or a sounding reference symbol.

5. The user apparatus as claimed in claim 2, wherein the cycle of Short-DRX is a discontinuous reception cycle in Long-Term Evolution (LTE).

6. The user apparatus as claimed in claim 1,
   wherein the receiver receives information indicating a timing at which to start transmission of the control signal at the transmission cycle which is based on the information specifying the transmission cycle, and
   the transmitter starts transmission of the control signal when performing discontinuous reception based on the information indicating the timing.

7. The user apparatus as claimed in claim 6, wherein the control signal is channel state information or a sounding reference symbol.

8. The user apparatus as claimed in claim 6, wherein the cycle of Short-DRX is a discontinuous reception cycle in Long-Term Evolution (LTE).

9. A user apparatus configured to perform discontinuous reception control for discontinuously receiving a signal transmitted from a base station, comprising:
- a receiver that receives, from the base station, transmission available period information indicating a transmission available period of a control signal when performing discontinuous reception at a cycle of Short-Discontinuous Reception (DRX), and transmission unavailable period information indicating a transmission unavailable period of the control signal when performing the discontinuous reception; and
- a transmitter that repeatedly performs control, based on the transmission available period information and the transmission unavailable period information, for starting the transmission available period when performing discontinuous reception at the cycle of Short-DRX,
- wherein the transmitter transmits the control signal in an active period during the transmission available period, and does not transmit the control signal in an active period in the discontinuous reception that falls within the transmission unavailable period that is started after the transmission available period ends, and
- wherein the user apparatus is for use in a communication system in which the Short-DRX and a Long-DRX are defined.

10. The user apparatus as claimed in claim 1, wherein the control signal is channel state information or a sounding reference symbol.

11. The user apparatus as claimed in claim 10, wherein the cycle of Short-DRX is a discontinuous reception cycle in Long-Term Evolution (LTE).

12. The user apparatus as claimed in claim 1, wherein the cycle of Short-DRX is a discontinuous reception cycle in Long-Term Evolution (LTE).

13. The user apparatus as claimed in claim 9, wherein the control signal is channel state information or a sounding reference symbol.

14. The user apparatus as claimed in claim 9, wherein the cycle of Short-DRX is a discontinuous reception cycle in Long-Term Evolution (LTE).

15. A signal transmission control method executed by a user apparatus configured to perform discontinuous reception control for discontinuously receiving a signal transmitted from a base station, comprising:
- a reception step of receiving information, from the base station, specifying a transmission cycle of a control signal in discontinuous reception performed at a cycle of Short-Discontinuous Reception (DRX), wherein the user apparatus is for use in a communication system in which the Short-DRX and a Long-DRX are defined; and
- a transmission control step of, when performing the discontinuous reception at the cycle of Short-DRX, transmitting the control signal in an active period in the discontinuous reception at a cycle longer than the cycle of Short-DRX based on the information specifying the transmission cycle.

16. A signal transmission control method executed by a user apparatus configured to perform discontinuous reception control for discontinuously receiving a signal transmitted from a base station, comprising:
- a reception step of receiving, from the base station, transmission available period information indicating a transmission available period of a control signal when performing discontinuous reception at a cycle of Short-Discontinuous Reception (DRX), and transmission unavailable period information indicating a transmission unavailable period of the control signal when performing the discontinuous reception, wherein the user apparatus is for use in a communication system in which the Short-DRX and a Long-DRX are defined; and
- a transmission control step of repeatedly performing control, based on the transmission available period information and the transmission unavailable period information, for starting the transmission available period when performing discontinuous reception at the cycle of Short-DRX, transmitting the control signal in an active period during the transmission available period, and not transmitting the control signal in an active period in the discontinuous reception that falls within the transmission unavailable period that is started after the transmission available period ends.

* * * * *